Patented May 14, 1929.

1,712,677

UNITED STATES PATENT OFFICE.

LESLIE HURST PETER, OF LONDON, ENGLAND, ASSIGNOR, BY MESNE ASSIGNMENTS, TO THE UNION SWITCH & SIGNAL COMPANY, OF SWISSVALE, PENNSYLVANIA, A CORPORATION OF PENNSYLVANIA.

ELECTRIC-CURRENT-RECTIFYING APPARATUS.

Application filed August 1, 1928, Serial No. 296,774, and in Great Britain July 20, 1927.

My invention relates to apparatus for rectifying alternating electric currents and has for its object to provide improved apparatus of this character whereby a pulsating unidirectional current initially obtained by rectification of the alternating current may be converted into a substantially constant direct current.

The invention contemplates for this purpose the combination with or superposition on a unidirectional pulsating current of a second pulsating or alternating current the phase and magnitude of the pulsations or ripples of this second current being such as to modify the wave form of the original current and thus eliminate or reduce its pulsations or ripples.

Accordingly a feature of the invention consists in achieving this result by combining with a unidirectional pulsating current an alternating current corresponding to the pulsations or ripples in the wave form of the unidirectional current but of opposite phase, this alternating current being derived from any suitable source but preferably from pulsating unidirectional current of the frequency of pulsation of the original current by means of a transformer.

Figure 1:
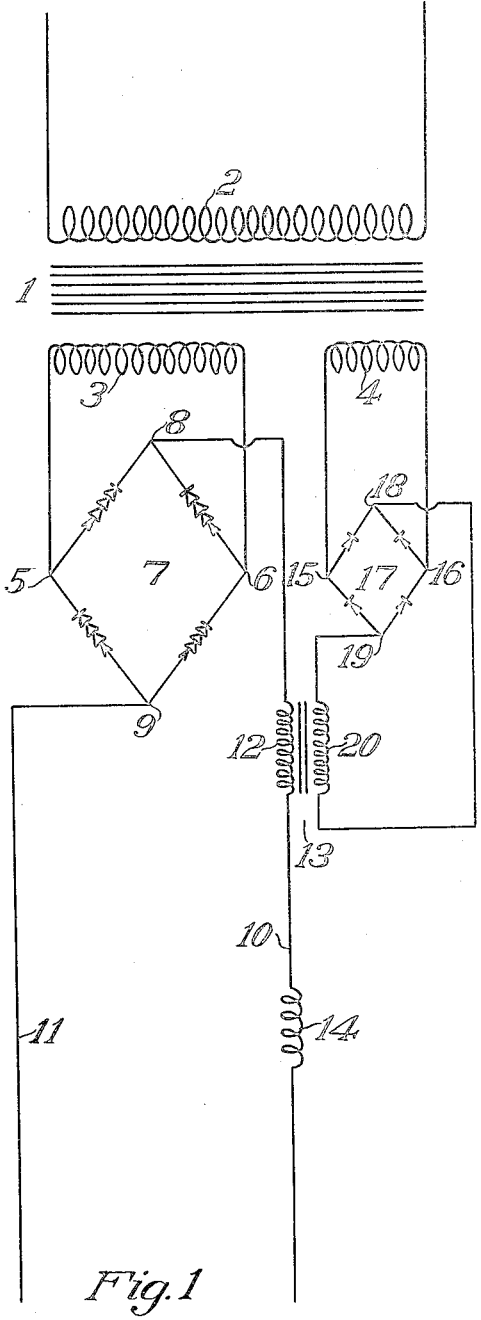
Figure 2:
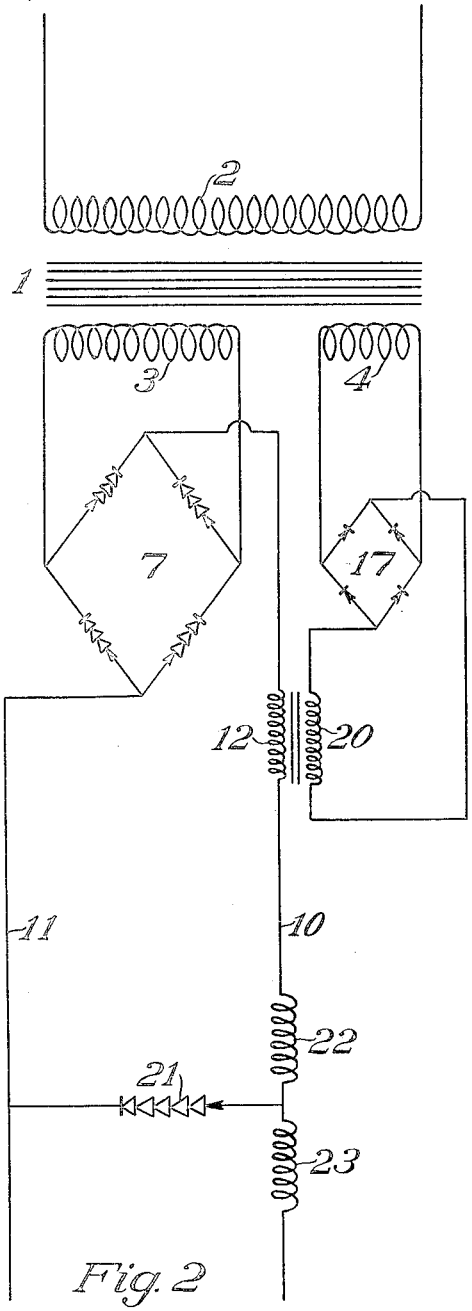

The invention is illustrated by way of example in the accompanying drawings, Figs. 1 and 2 of which are diagrammatic views of systems of connections embodying the invention.

Referring now first to the apparatus diagrammatically illustrated in Fig. 1, it will be seen that this apparatus comprises a transformer 1 having its primary winding 2 connected to the source of alternating current to be rectified, and provided with two secondary windings 3, 4. The terminals of the secondary winding 3 are connected to the diagonally opposite points 5, 6 of a rectifying system 7 comprising four rectifying elements or groups of elements arranged in the well known bridge connection so as to give full wave rectification. The other pair 8, 9 of diagonally opposite points of the rectifying system 7 are connected to the direct current circuit to be supplied with rectified current by suitable conductors 10, 11, the circuit of one 10, of which includes the secondary winding 12 of a transformer 13, hereinafter termed the smoothing transformer, a suitable inductance 14 being also connected in the conductor 10.

The terminals of the other secondary winding 4 of the main transformer 1 are connected to the diagonally opposite points 15, 16 of a second rectifying system 17 similar to the system 7, the other diagonally opposite points 18, 19 of the rectifying system 17 being connected to the terminals of the primary winding 20 of the smoothing transformer 13.

The operation of the apparatus is as follows:—

The alternating current traversing the secondary winding 3 of the main transformer 1 is converted, in the rectifying system 7 to which this winding is connected, into unidirectional pulsating current in the manner now well known in the art. The rectified half waves of the alternating current as modified by the presence of the inductance 14 constitutes a unidirectional current of rippled or undulatory wave form which may be regarded as comprising two component currents namely, a direct current of constant value and an alternating current component representing the ripple of the wave form.

The unidirectional pulsating current derived from the second rectifying system 17 is of similar form and as this current is supplied to the primary winding 20 of the smoothing transformer 13 the secondary winding 12 of this transformer is traversed by alternating current corresponding to the ripple component of the current in the primary winding 20 but of opposite phase. The alternating current owing to the connections above described is superposed in the direct current circuit on the rippled unidirectional current supplied from the first rectifying system 7 with the result that the alternating current supplied from the secondary winding 20 of the smoothing transformer 13 can be arranged to neutralize or to oppose wholly or partly the ripple component of the current supplied to the direct current circuit by the first rectifying system 7.

It will be understood that the characteristics of the rectifying elements of the two systems 7, 17 and of the smoothing transformer 13 are so designed as to effect the result above explained and the magnitude of the currents involved and their phase relations may be arranged to be adjusted for this purpose in any suitable manner.

Referring now to the modified arrangement illustrated in Fig. 2, it will be seen that the apparatus of Fig. 1 is shown as combined with other arrangements for smoothing the current supplied to the direct current circuit in cases in which it may be disadvantageous or difficult to effect the required degree of constancy of the direct current as finally utilized by the arrangements shown in Fig. 1.

The additional smoothing arrangements indicated in Fig. 2 consist of a device 21 permitting the passage of current in one direction only connected in shunt across the direct current conductors 10, 11 with two impedances or reactors 22, 23 connected in the direct current circuit conductor 10.

The rectifying systems 7, 17 above described may be of any suitable type and may for instance comprise rectifying elements of the kind consisting of a plate or body of metal having a layer of a compound of the metal formed directly thereon.

The invention is however not limited to any particular type of rectifying system or element nor to the particular apparatus above described by way of example which may be varied in many respects without exceeding the scope of the invention which is applicable to all cases in which it is desired to eliminate or to reduce periodic variations in a unidirectional current.

Having now particularly described and ascertained the nature of my said invention and in what manner the same is to be performed, I declare that what I claim is:

Apparatus for rectifying alternating current, comprising a main transformer having a primary winding supplied with alternating current and two secondary windings, a first full wave rectifier having its input terminals connected with one of said secondary windings, an output circuit connected with the output terminals of said rectifier, an auxiliary transformer the secondary winding of which is connected in series in said output circuit, and a second full wave rectifier having its input terminals connected with the other secondary winding of said main transformer and its output terminals connected with the primary winding of said auxiliary transformer.

In testimony whereof I affix my signature.

LESLIE HURST PETER.